United States Patent
Goodwin et al.

(10) Patent No.: US 9,777,846 B2
(45) Date of Patent: Oct. 3, 2017

(54) RELATING TO GATE VALVES

(71) Applicant: PROCESS COMPONENTS LIMITED, Macclesfield, Cheshire (GB)

(72) Inventors: Anthony Goodwin, Macclesfield (GB); Paul Bailey, Macclesfield (GB)

(73) Assignee: Process Components Limited, Macclesfield, Cheshire (GB)

( * ) Notice: Subject to any disclaimer, the term of this patent is extended or adjusted under 35 U.S.C. 154(b) by 0 days.

(21) Appl. No.: 14/423,759

(22) PCT Filed: Nov. 7, 2013

(86) PCT No.: PCT/EP2013/073289
§ 371 (c)(1),
(2) Date: Feb. 25, 2015

(87) PCT Pub. No.: WO2014/072420
PCT Pub. Date: May 15, 2014

(65) Prior Publication Data
US 2015/0300507 A1    Oct. 22, 2015

(30) Foreign Application Priority Data
Nov. 9, 2012  (GB) .................................. 1220305.5

(51) Int. Cl.
*F16K 3/02* (2006.01)
*F16K 11/07* (2006.01)

(52) U.S. Cl.
CPC .......... *F16K 3/0281* (2013.01); *F16K 3/0254* (2013.01); *F16K 11/07* (2013.01)

(58) Field of Classification Search
CPC ...... F16K 11/07; F16K 3/0254; F16K 3/0281; F16K 3/0227; F16K 3/0263; F16K 3/18
(Continued)

(56) References Cited

U.S. PATENT DOCUMENTS 6,745,999 B1    6/2004  Heinecke et al.
2005/0001195 A1*  1/2005  Blease .................. F16J 15/104
                                                  251/171
(Continued)

FOREIGN PATENT DOCUMENTS

DE    10163916 A1    7/2003
DE   102009028652 A1  2/2011
(Continued)

OTHER PUBLICATIONS

Machine Translation of DE10163916 (translation performed on Jun. 9, 2016).*
(Continued)

*Primary Examiner* — Michael R Reid
(74) *Attorney, Agent, or Firm* — Banner & Witcoff, Ltd.

(57) ABSTRACT

A gate valve (10) is provided and comprises: a valve body (12,14) including an aperture (20, 22); a gate (42) reciprocally movable within the body between a first position in which the aperture is occluded to a second position in which the aperture is open; a bearing member (36a, 36b) over which the gate moves in the body; and a loading member (30a, 30b) for urging the bearing member against the gate. The loading member comprises a lattice-like elastomeric mat (30a, 30b).

22 Claims, 21 Drawing Sheets

(58) Field of Classification Search
USPC ....... 251/170, 171, 174, 193, 195, 200, 202, 251/326–329
See application file for complete search history.

(56) References Cited

U.S. PATENT DOCUMENTS

| | | | |
|---|---|---|---|
| 2007/0181841 A1* | 8/2007 | Werner | ................ F16K 3/0281 251/326 |
| 2009/0173421 A1 | 7/2009 | Love | |
| 2012/0146293 A1 | 6/2012 | Reeb et al. | |

FOREIGN PATENT DOCUMENTS

| | | |
|---|---|---|
| EP | 0037906 A1 | 10/1981 |
| JP | 2000266193 A | 9/2000 |
| KR | 100809640 B1 | 3/2008 |

OTHER PUBLICATIONS

International Search Report and Written Opinion dated May 20, 2014 (PCT/EP2013/073289); ISA/EP.
UKIPO Search Report dated Dec. 14, 2012 (GB1220305.5).

\* cited by examiner

Figure 16
Figure 17
Figure 18
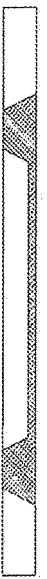
Figure 19

RELATING TO GATE VALVES

The present application is a U.S. National Phase filing of International Application No. PCT/EP2013/073289, filed on Nov. 7, 2013, designating the United States of America and claiming priority to United Kingdom Patent Application No. 1220305.5 filed Nov. 9, 2012. The present application claims priority to and the benefit of all the above-identified applications, which are all incorporated by reference herein in their entireties.

FIELD

The present invention relates generally to a valve and particularly to an orifice valve in which a gate or the like is used to selectively open or close a flow path.

BACKGROUND

Orifice valves generally include a valve body which includes an aperture and a movable gate which is reciprocal between an open and closed position to accommodate flow of material through the valve or to block the flow. There are a variety of considerations when gate valves are developed, many of which depend on the type of material which is to flow through the valve, for example solids (e.g. powders and granules up to a 5 mm particle size) or liquids.

SUMMARY OF SELECTED INVENTIVE ASPECTS

The present invention seeks to provide improvements over known orifice valves.

According to a first aspect of the present invention there is provided a gate valve comprising a valve body including an aperture, a gate reciprocally movable within the body between a first position in which the aperture is occluded and the second position in which the aperture is open, a bearing member over which the gate moves in the body, and a loading member for urging the bearing member against the gate, in which the loading member comprises a lattice-like elastomeric mat.

One essential consideration when designing a gate valve is that an adequate seal is provided around the gate so that material does not leak from the periphery of the aperture into the interior of the valve body where contamination issues may be relevant and where it may interfere with the valve mechanism. In addition, in order for the seal to be as useful as possible there must be a balance between creating a seal and yet not restricting the reciprocal movement of the gate.

The present invention therefore provides an elastomeric mat with a lattice-like configuration. The mat is used as a loading member to urge a bearing member against the gate, for example to provide a seal. It has been found that a lattice-like configuration gives particular benefits, including an even seal.

The elastomeric mat may be formed separately from and can be placed against the bearing member; in other words the mat is discrete and can be arranged on the bearing member. Alternatively, the mat may be formed as a preassembled "laminate" for example by bonding the mat directly to the bearing member so that effectively they form a single, integral unit.

According to a further aspect of the invention there is provided a gate valve comprising a valve body including an aperture, a gate reciprocally movable within the body between a first position in which the aperture is occluded and a second position in which the aperture is open, a bearing member over which the gate moves in the body, and a loading member for urging the bearing member against the gate, in which the loading member comprises a discrete elastomeric mat which is separate from and can be arranged on the bearing member.

The mat may comprise a lattice-like structure. Alternatively, the discrete mat may be formed as a laminar, pad-like element.

Elastomeric mats of the present invention may have plurality of cut outs, for example formed in a regular or irregular array. In some embodiments the cut outs are generally polygonal, for example hexagonal. In some embodiments the mat has a generally honeycomb-like configuration.

The mat may comprise a framework, for example an open framework (or a framework with cut-outs and thin webs spanning the cut outs). The frame of such mats may have a chamfered section, which has been found to give benefits in terms of loading characteristics.

The mat may be formed from a material having a Shore hardness in the range A5 to A25, for example approximately 10. Materials such as silicon may be used.

In some embodiments bearing members are provided on opposite sides of a gate and respective loading members are provided to urge the bearing members against the gate. In other words, a symmetrical arrangement in which a pair of bearing members and a pair of loading members (at least) may be provided.

According to a further aspect there is provided a loading member for a gate valve of the type comprising a valve body including an aperture, a gate reciprocally movable within the body between a first position in which the aperture is occluded and a second position in which the aperture is open, and a bearing member over which the gate moves in the body, the loading member comprising a lattice-like elastomeric mat.

The mat of this aspect may be used in combination with gate valves formed according to aspects and embodiments of the present invention.

According to a further aspect there is provided a gate valve comprising a valve body including an aperture, and a gate reciprocally movable within the body between a first position in which the aperture is occluded and a second position in which the aperture is open, in which the valve body comprises two complimentary housings, and in which each section comprises an aperture-defining part which is separate from and carried on or by a main body part.

The requirements for the area immediately surrounding the aperture may be different from those of the rest of a body. By providing a housing section which includes these two major parts, this allows the possibility for different materials, or grades of materials, to be used; although of course it is possible to use the same or similar materials for the two parts. For example, in some embodiments a main body part is formed from aluminium and an aperture-defining part in the form of an insert is formed from stainless steel. This allows for certain requirements to be met relating to product-contacting sections of the valve whilst retaining the possibility to use a different (for example cheaper) material for the remainder.

According to a further aspect there is provided a gate valve comprising a valve body including two complimentary housing sections each having an aperture, a gate reciprocally movable within the body between a first position in which a flow path between the apertures is occluded and the second position in which the flow path is open, bearing members provided on opposite sides of the gate, and respective loading members provided for the bearing members to urge them against the gate.

The present invention therefore provides a valve with a symmetrical arrangement having a pair of housings (for example the two-part castings described herein), a pair of bearing members and a pair of loading members with one member of each pair being provided either side of a gate.

The loading members may comprise an elastomeric mat, for example a lattice-like mat as described herein. Alternatively or additionally the loading members may comprise one or more crinkled rings or the like.

The gate may comprise a slide plate which itself may have an aperture which can be brought in to or out of alignment with the housing section apertures to occlude or open the flow path.

The bearing members may comprise sealing plates, for example sheets made from a plastics material such as a thermoplastic polyester; one example of which is Ertalyte (RTM).

The sealing plate may be at least partly flexible. This allows the plates either side of the gate to move during movement and to accommodate variations in the gate whilst maintaining an effective seal.

The gate may be formed from metal, for example stainless steel. In some embodiments the gate is electro-polished which may have particular benefits for certain products including powders.

The aperture may be generally circular. Other shapes of aperture are possible including regular and irregular shapes such as square, triangular, rectangular and ellipsoidal.

The size of the aperture may be in the range from 1 to 12 inches. The aperture size will be determined by the flow rate required in use and/or to suit a process line into which it may be installed.

The gate may be movable between the first and second positions manually or automatically using an actuating means. For example the gate may include a handle to allow for manual operation or a hand wheel may be provided; alternatively pneumatic actuation may be required or preferred.

There may be provided means for adjusting the loading on the bearing members. For example one or more shims may be inserted to increase loading.

According to a further aspect there is provided a gate valve comprising a valve body including an aperture, a slide gate reciprocally movable within the body between a first position in which the aperture is occluded and a second position in which the aperture is open. The valve body comprising a mouth for receiving the gate and within which the gate slides, in which the mouth comprises a packing gland formed from an elastomeric material.

The point of entry of the gate in to and out of the body is an important area to seal. An elastomeric sealing element may therefore be used to provide an effective and reliable seal.

According to a further aspect there is provided a gate valve comprising a valve body including two complimentary housing sections each having an aperture, and a gate reciprocally movable within the body between a first position in which a flow path between the apertures is occluded and a second position in which the flow path is open, in which one or more support rails are provided on or by the valve body for supporting an actuator.

Aspects and embodiments of the present invention may have utility in a variety of situations, for example in gravity fed, vacuum or force fed flow environments. In some embodiments the valve is adapted to control the flow of powdered and/or granular material, for example with a particle size of up to approximately 5 mm.

Different aspects and embodiments of the present invention may be used separately or together.

Further particular and preferred aspects of the present invention are set out in the accompanying independent and dependent claims. Features of the dependent claims may be combined with the features of the independent claims as appropriate, and in combination other than those explicitly in the claims.

BRIEF DESCRIPTION OF THE DRAWINGS

The present invention will now be more particularly described, by way of example, with reference to the accompanying drawings in which;

FIG. 16 is a side elevation of the mat of FIGS. 11 to 15;

FIG. 17 is a section taken along line A-A of FIG. 15;

FIG. 18 is a section taken along line B-B of FIG. 14;

FIG. 19 is a section taken along line D-D of FIG. 14;

DETAILED DESCRIPTION OF EXAMPLE EMBODIMENTS

Figure 1:
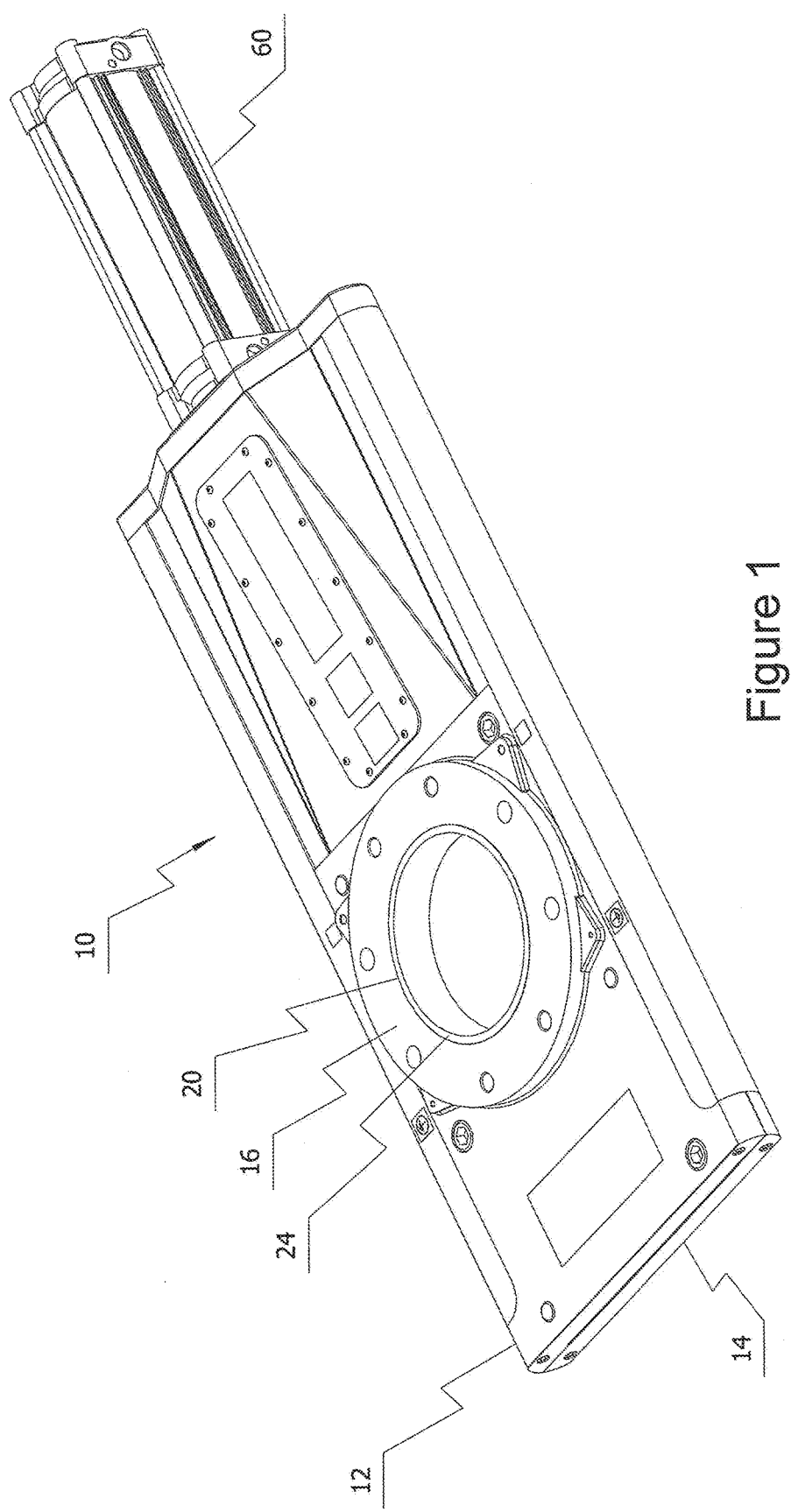
FIG. 1 is a perspective view of a gate valve formed according to an embodiment of the present invention.
Figure 2:
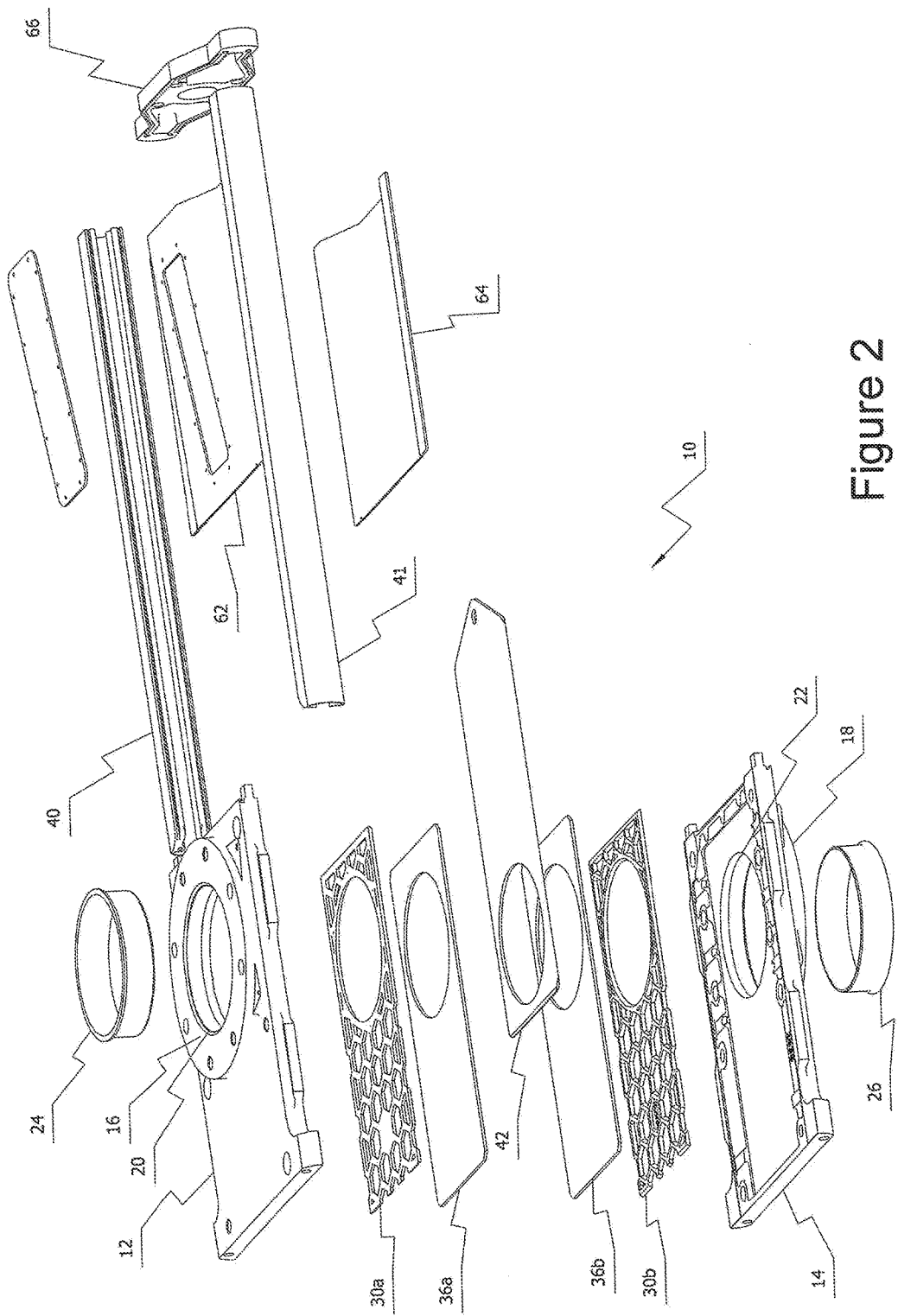
FIG. 2 is an exploded perspective view of the valve of FIG. 1.

Referring first to FIGS. 1 and 2 there is shown a slide valve generally indicated 10.

The valve 10 comprises a cast aluminium body made up of two opposing complimentary housing parts 12, 14.

The housing parts 12, 14 are generally flat plate-like members having at one end a porthole 16, 18 defining a respective aperture 20, 22. The bore of each aperture 20, 22 is fitted with an annular liner 24, 26. In this embodiment the liners are formed from stainless steel; in other embodiments the liners may be formed, for example, from aluminium, plastics or brass.

Figure 3:
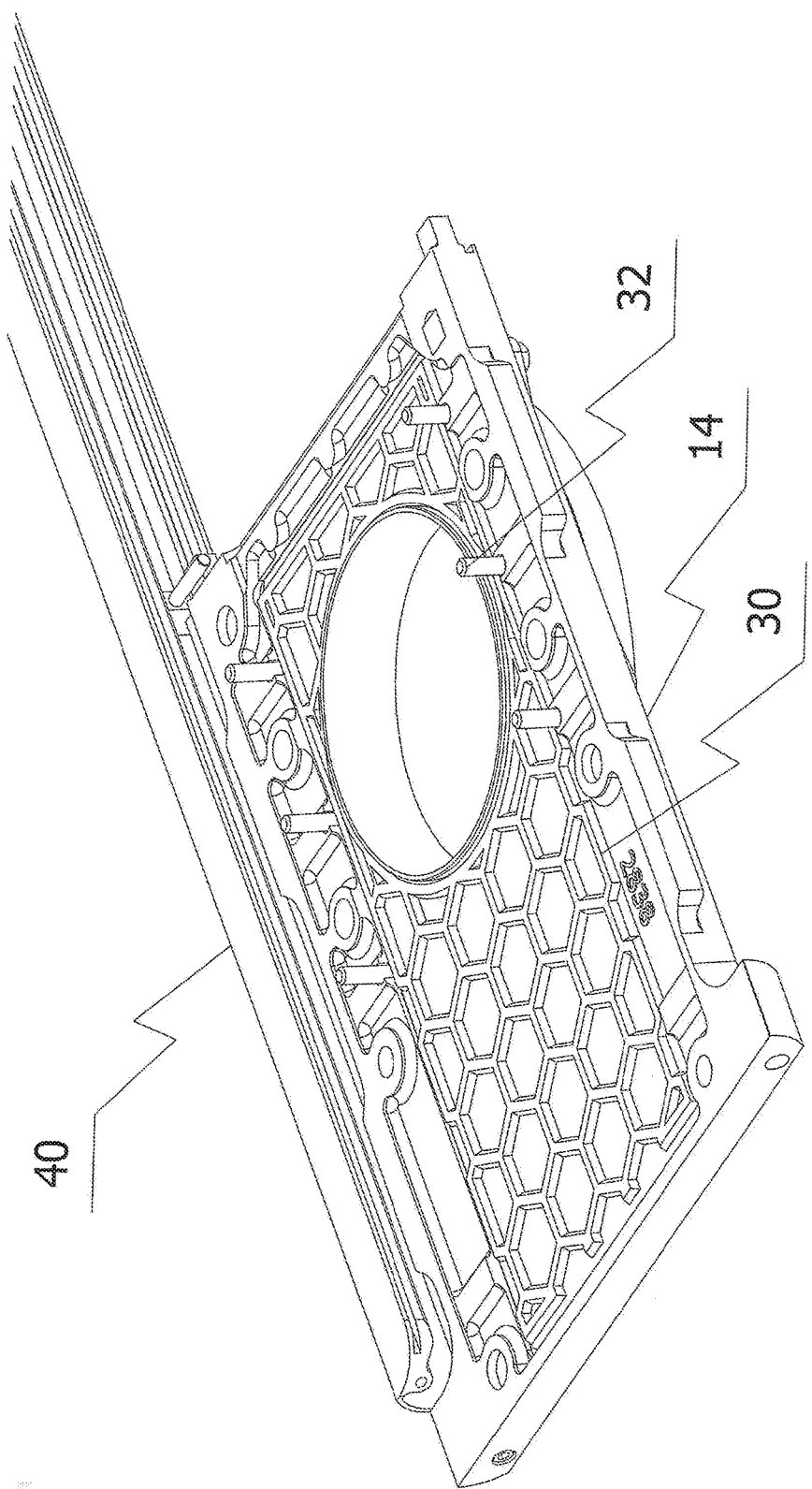
FIG. 3 is a perspective view of a housing section the valve shown partially assembled.

Referring now also to FIG. 3 the underside of the housing section 14 is shown partially assembled.

Figure 4:
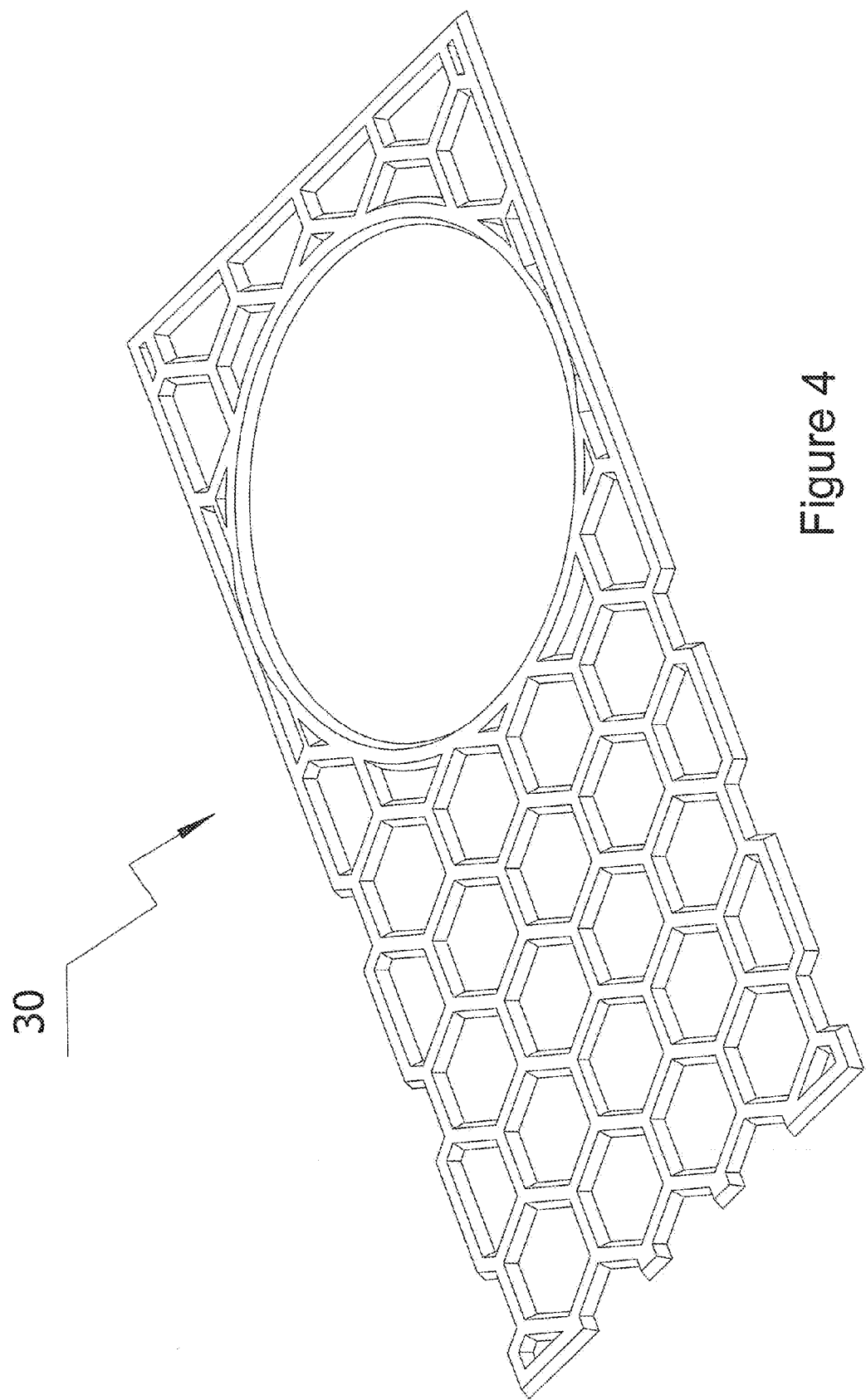
FIG. 4 is a perspective view of an elastomeric loading mat forming part of the assembly of FIG. 3.

An elastomeric loading mat 30b is placed in the cavity of the section 14. The mat is shown in more detail in FIG. 4 and comprises an open framework of silicone rubber material (in this embodiment with a Shore hardness of A10).

Also shown in FIG. 3 are six Nylon (RTM) dowel pins 32 in a rectangular array around the aperture 22 which are used to guide a slide plate (see below). Further, one side rail support 40 is shown extending along one side of the housing section, the purpose of which is described in more detail below.

Figure 5:
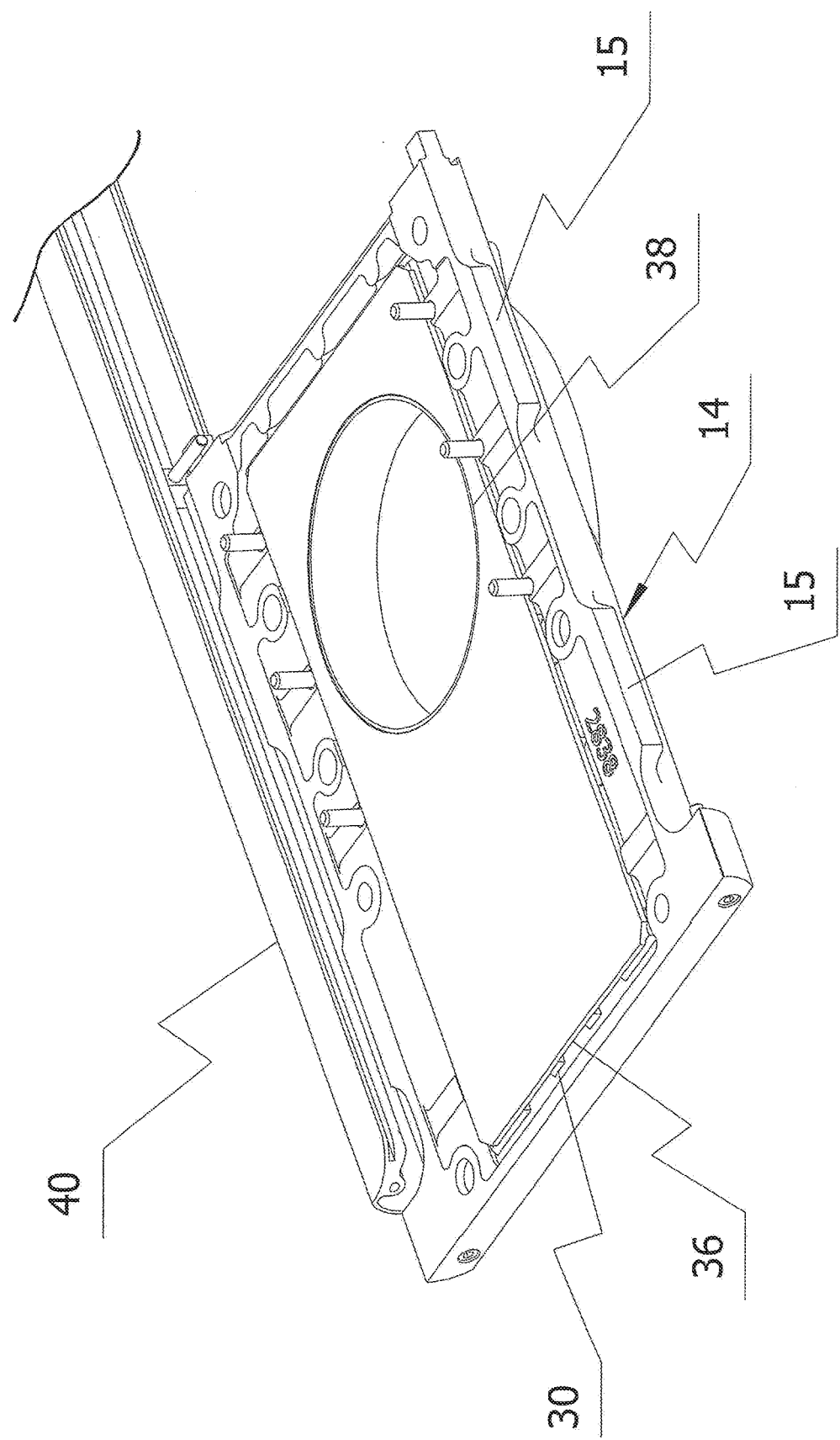
FIG. 5 is a perspective view of the assembly of FIG. 4 additionally shown with a bearing plate in position.

Referring now to FIG. 5, a sheet 36b (in this embodiment approximately 4 mm thick) of Ertalyte polyester plastics material is assembled onto the mat 30b. The sheet 36b is a similar size to the mat 30b, but in this embodiment is slightly smaller. In other embodiments (not shown) one or more sides of the plate are flush with the mat; in some embodiments the mat and plate are substantially the same size.

The sheet includes an aperture 38 which is in register with the housing aperture 22.

The sheet is the bearing surface on which the slide plate moves (see below) and generally rigid but is of sufficient thickness to allow it to flex and move against the slide plate as it moves back and forth.

Figure 6:
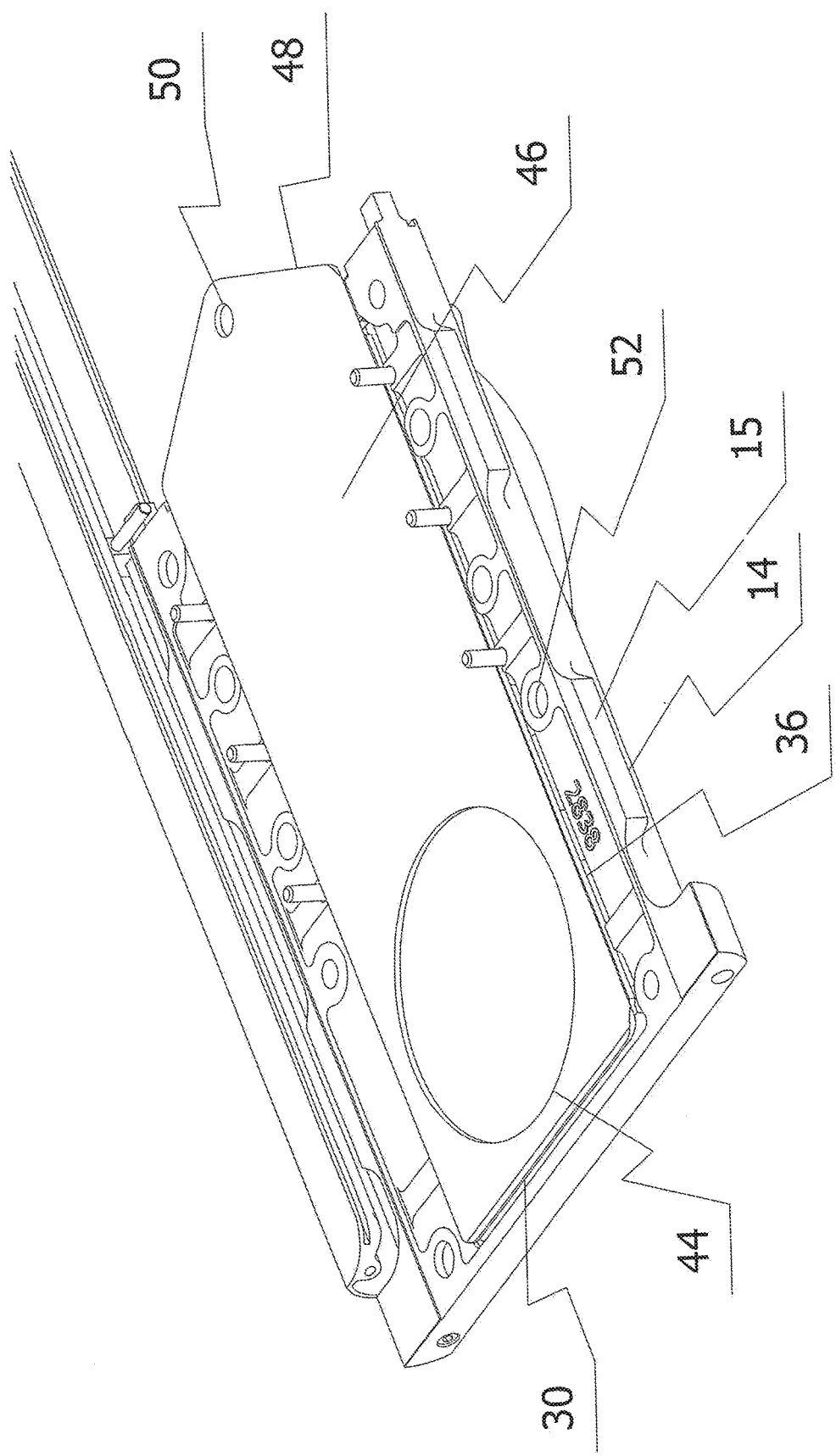
FIG. 6 is a perspective view of the assembly of FIG. 5 additionally shown with a slide plate in position.

In FIG. 6 a stainless steel slide plate (or gate) 42 is placed onto the sheet 36 to complete the bottom half of the valve. The plate 42 is generally rectangular and has at one end an aperture 44 and at the other end a solid section 46 which terminates with a triangular end portion 48 with an actuator hole 50.

It will be noted that in the position shown in FIG. 6, with the slide plate fully inserted into the housing section cavity, the solid section 46 of the slide plate 42 covers the housing section aperture 22.

Figure 7:
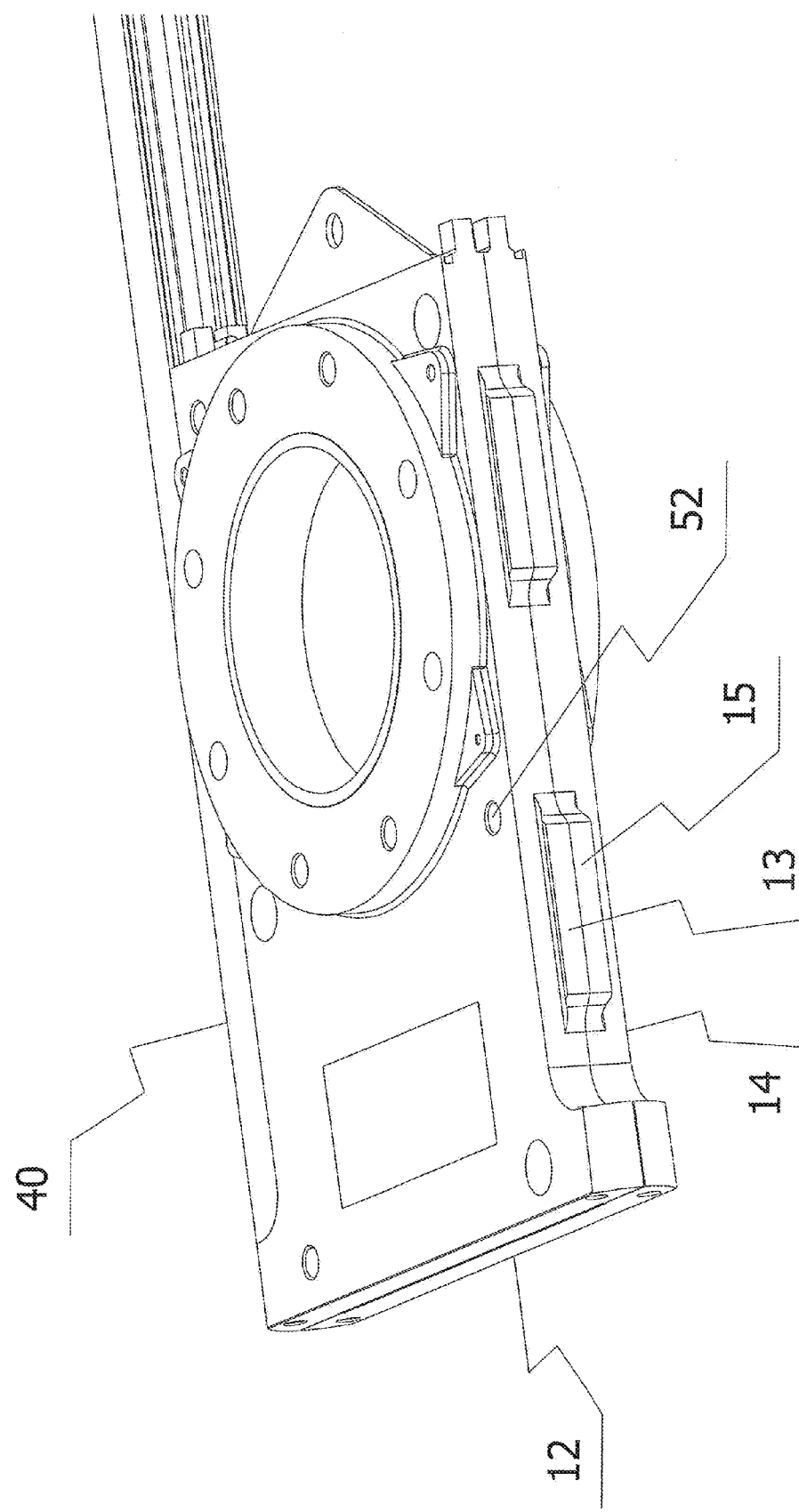
FIG. 7 is a perspective view of the assembly of FIG. 6 additionally shown with a complimentary housing section in position.

In FIG. 7 the top half of the valve is shown having been built up in the same way as the bottom half, with a loading mat 30a and Ertalyte bearing plate 36a and then lowered on to the bottom half. The dowel pins 32 locate in corresponding holes (not shown) in the housing section 12.

The housing sections 12, 14 are now bolted together through bolt holes 52.

Figure 8:
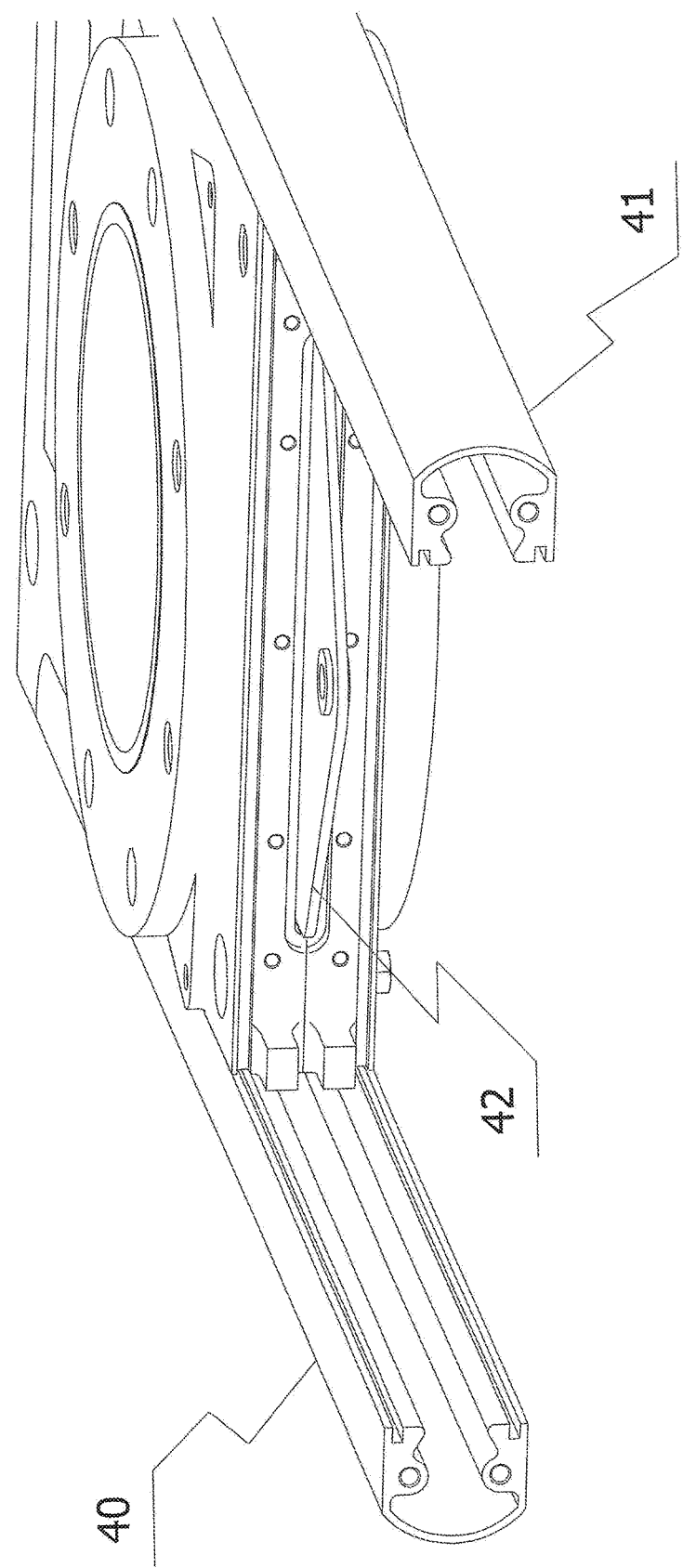
FIG. 8 is an end view of the assembly of FIG. 7 following addition of a second support rail.
Figure 9:
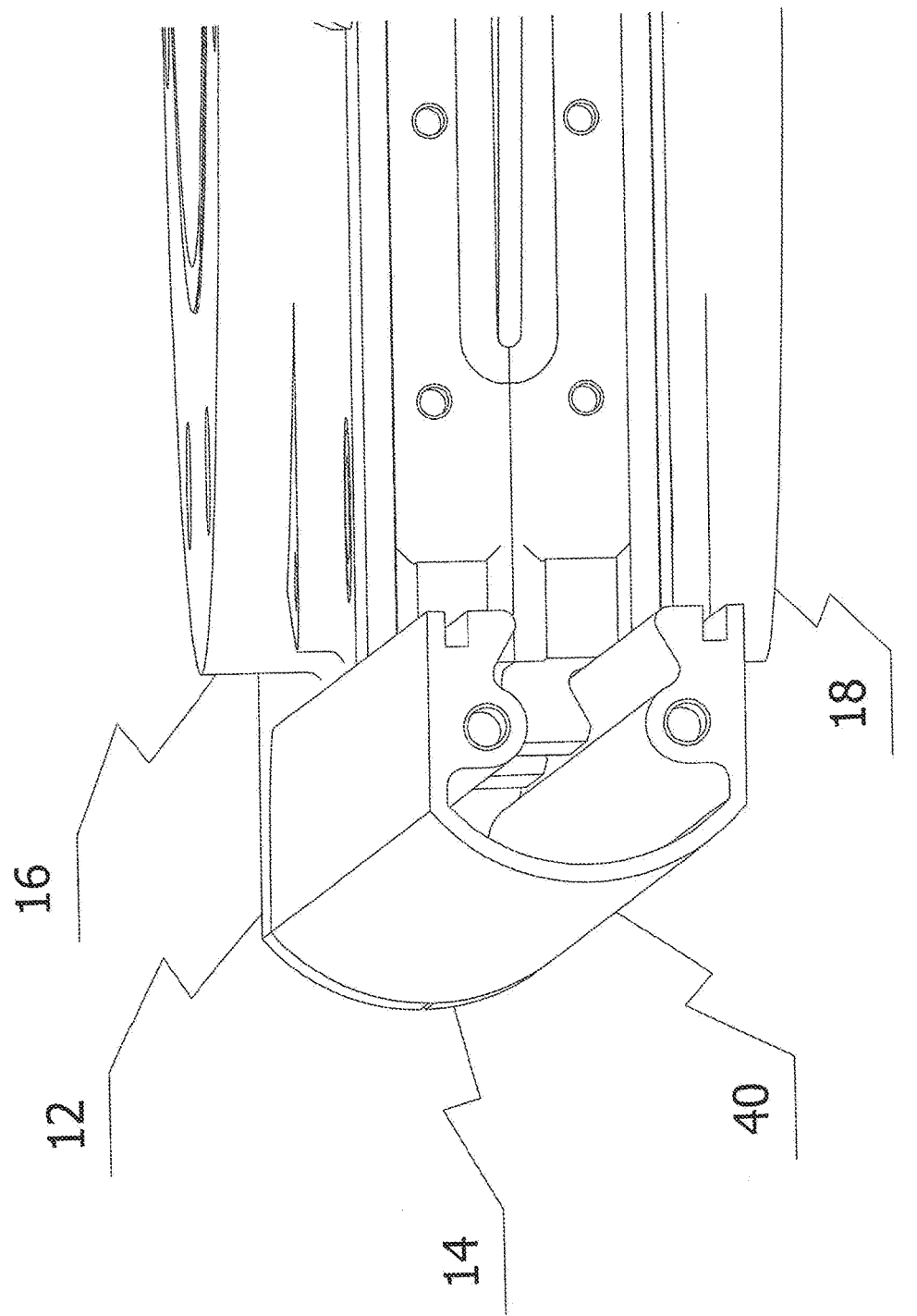
FIG. 9 is a magnified view of the end region of FIG. 8.
Figure 10:
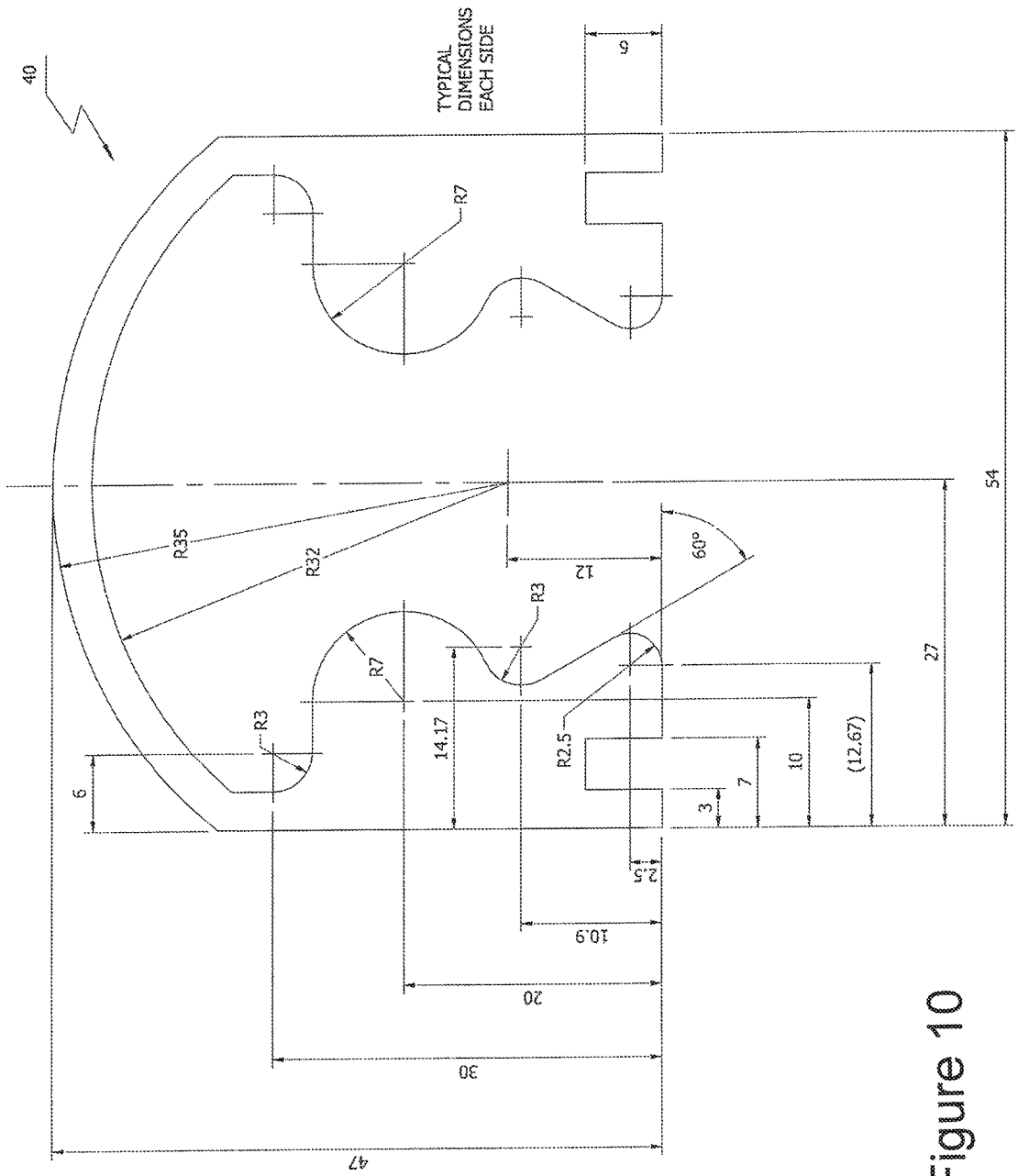
FIG. 10 is a section of the actuator/operator support rails.

After the sections are secured two side rail sections 40, 41 are added. For this purpose each of the housing sections 12, 14, is provided with two opposing pairs of lugs 13, 15. The sections 40, 41 are extruded aluminium rails which in this embodiment are anodised. As shown best in FIGS. 8 to 10, the section of the open side of the rails is designed to cooperate with the lugs 13, 15 so that they can "dovetail" and be slid on and along the valve body into position. Note that the dimensions specified in FIG. 10 are not limiting in any way.

It will be noted that the rails 40, 41 extend considerably beyond the end of the valve housing. This is to allow them to be used as a support for an actuator for the slide plate. For example, a pneumatic cylinder 60 can be mounted on to the rails, as shown in FIG. 1 (with the cylinder shown partly encased in cowling sections 62, 64 and fitted to an end plate 66). Alternatively a hand wheel could be mounted on to the rails for use as an actuator for the slide plate.

With the valve fully assembled, the slide plate 42 can be reciprocated between the closed position illustrated in FIG. 6 to an open position in which it is withdrawn from the valve housing until its aperture 44 is aligned with the housing apertures 20, 22 whereupon product (e.g. powder) can flow through the valve.

Conversely, if the slide plate is inserted back to the position shown in FIG. 6 the apertures 20, 22 are now occlude, blocking the flow path through the valve.

In this embodiment the surface area of the mats 30a, 30b is very important because it must provide sufficient loading on to the bearing plates 36a, 36b to give a seal against the slide gate 42, but must not produce so much force that the slide plate cannot actuate.

Figure 11:
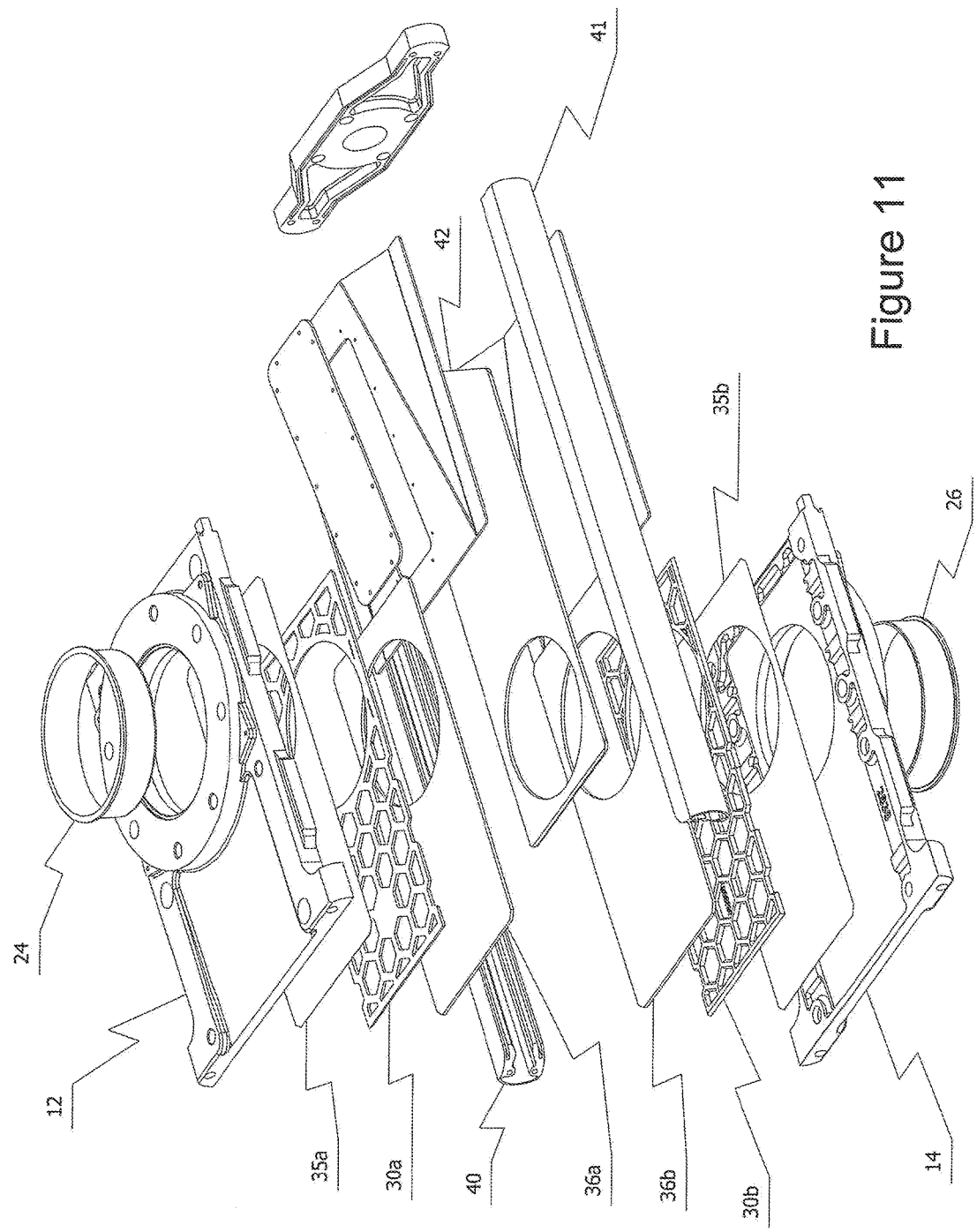
FIG. 11 is an exploded view of the valve of FIG. 2, shown with optional shim sheets to adjust loading force.
Figure 12:
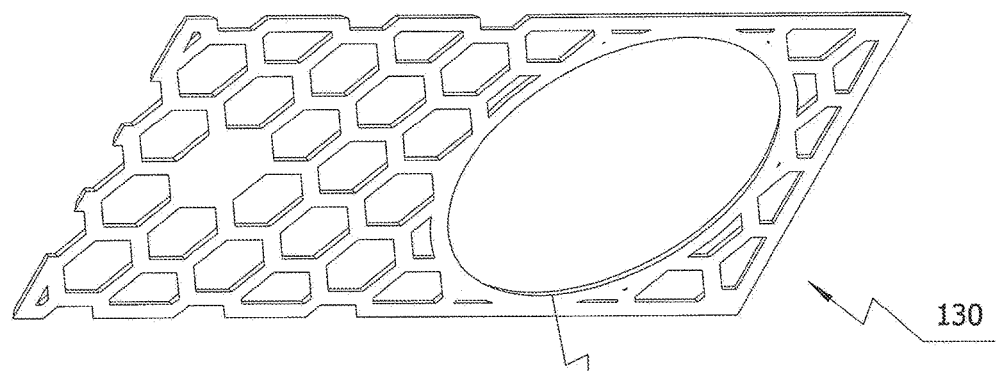
FIG. 12 is a perspective view of the top of an elastomeric loading mat formed according to the present invention.
Figure 13:
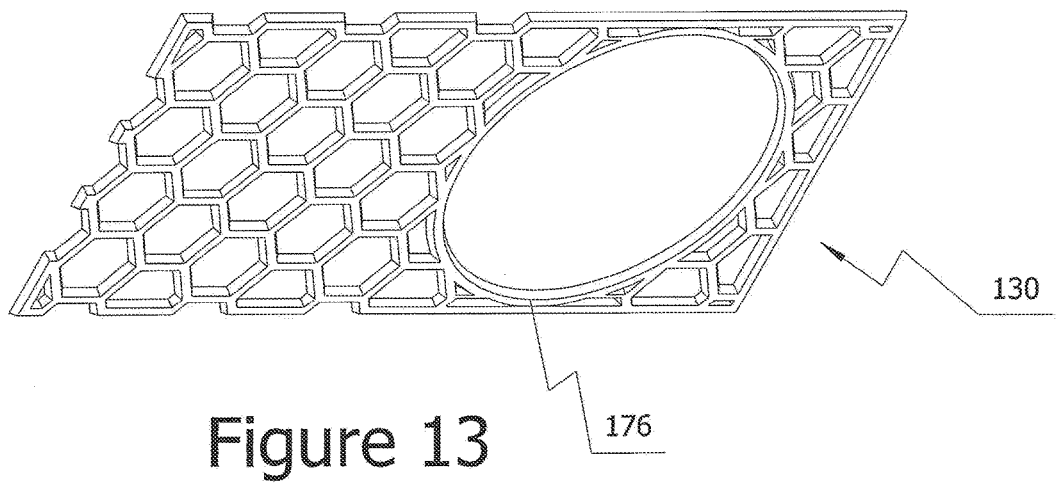
FIG. 13 is a perspective view of the underside of the mat of FIG. 12.
Figure 14:
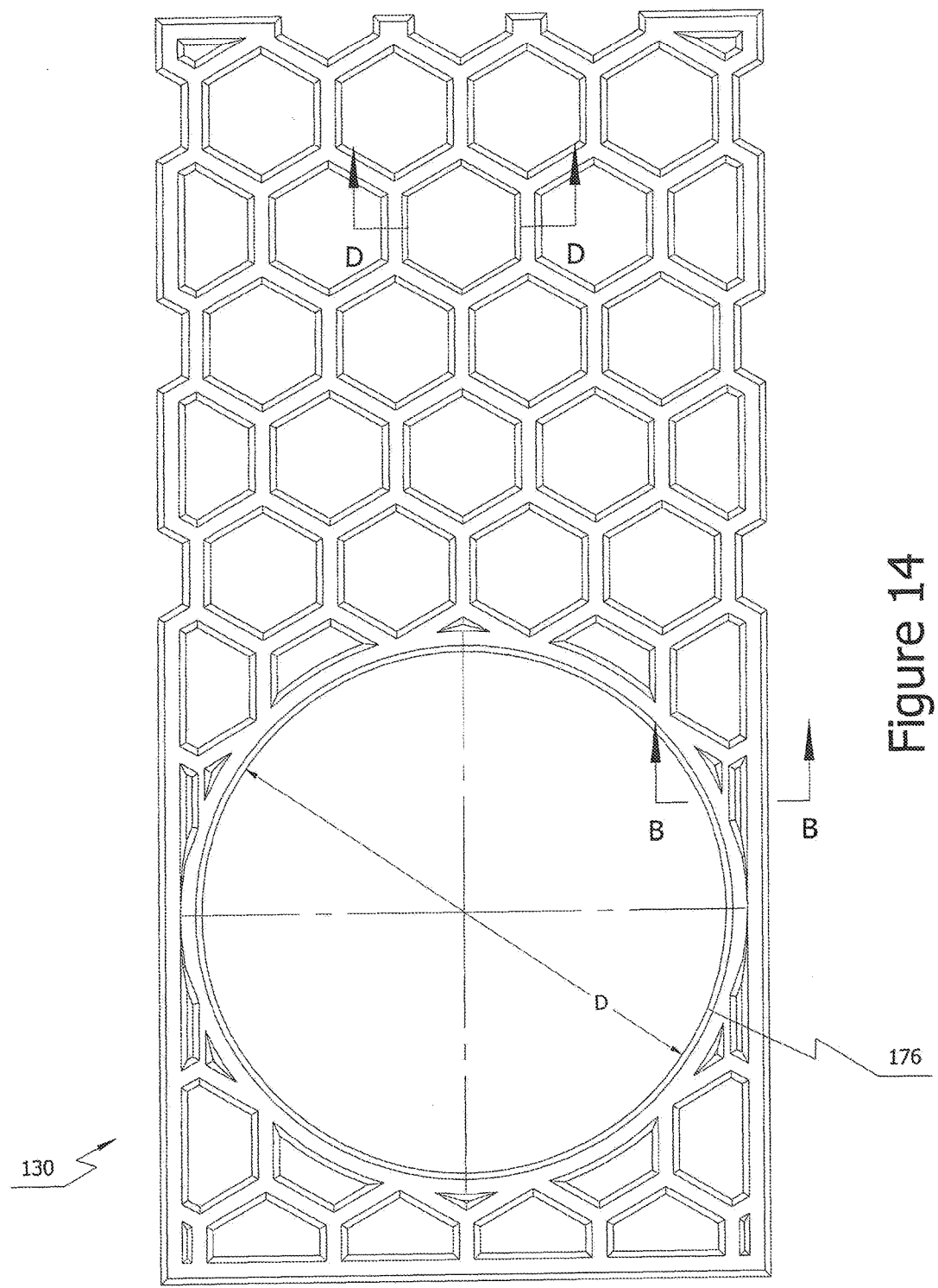
FIG. 14 is a plan view of the view of FIG. 13.
Figure 15:
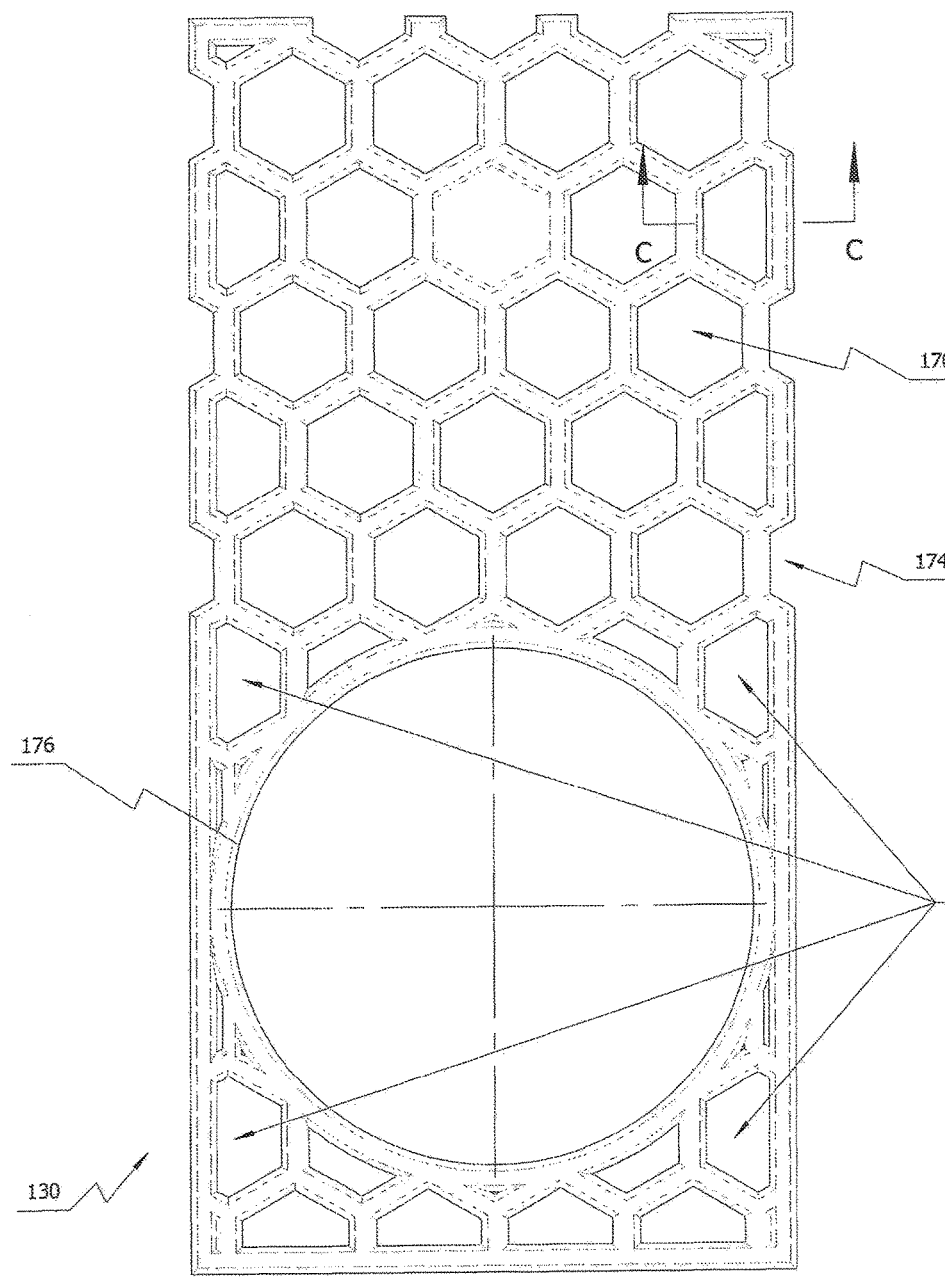
FIG. 15 is a plan view of the view of FIG. 12.
Figure 20:
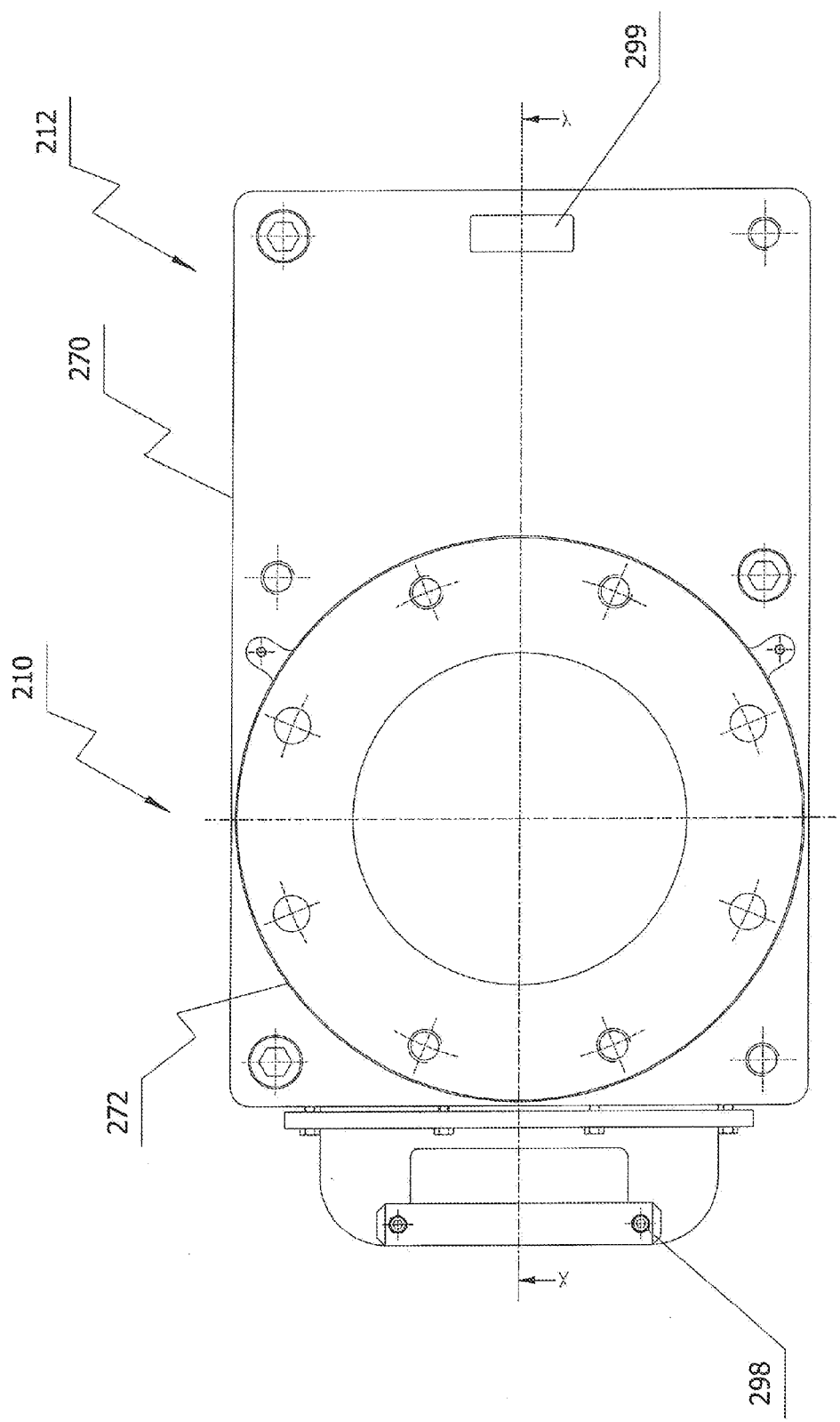
FIG. 20 is a plan view of a valve formed according an alternative embodiment of the present invention.

FIG. 11 shows the same valve as FIGS. 1 to 9, except that in addition two shims 35a, 35b are positioned between the mats 30a, 30b and the housing sections 12, 14. The PTFE shims are used to increase the compression of the mats 30a, 30b on the bearing plates 36a, 36b.

Referring now to FIGS. 12 to 18 there is shown a loading mat 130. The mat could be used in conjunction with gate valves formed according to other aspects and embodiments of the present invention, or with other valves not forming part of the present invention.

The mat 130 is generally rectangular and in this embodiment is formed from moulded silicone rubber having a Shore hardness of A10 and is approximately 5 mm thick.

The mat 130 is formed as a "honeycomb" configuration with a plurality of hexagonal cut-outs 170, some half-hexagon cut-outs 172 at the sides and partial hexagon cut-outs 174 at the edges.

At one end of the mat 130 is a circular opening 176 which can be aligned, in use, with a flow aperture in a valve body. Examples of the diameter D of the opening 176 include in the region of 100 mm, 150 mm, 200 mm and 250 mm. Other diameters are possible and other, non-circular shapes can be incorporated into the mat to correspond to apertures in a valve body.

As shown best in FIGS. 16 to 19 the frame of the mat 130 has a cross section with chamfered sides, giving a trapezoidal-like section. In use, the mat may be oriented so that the shorter of the parallel sides is in contact with a bearing member i.e. oriented towards the gate. Of course, the chamfered section means that the diameters and other dimensions of the mat vary slightly depending on where on the height of the frame strips measurements are taken.

It has been found that the lattice-like configuration can provide an even sealing pressure on bearing plates in a gate valve system, and that the even sealing pressure continues as the gate reciprocates. Tests have shown this configuration to have significant benefits when used in a valve system for controlling the flow of fine powders.

Referring now to FIGS. 20 to 23 there is shown a gate valve 210 formed according to an alternative aspect.

The valve 210 comprises two complimentary housing sections 212, 214. Each section 212, 214 comprises a main body part 270, 271 and a separate porthole part 272, 273 which is bolted to the main body part from the underside of the section. Each porthole has an aperture 274, 276.

Within the chamber defined by the sections 212, 214 is a reciprocating blade 280 and on opposite sides of the blade 280 a pair of bearing plates 282, 284 are provided. The plates 282, 284 are urged against the blade 280 by "wavey" springs 290.

The housing sections 212, 214 are bolted together.

The blade 280 moves in to and out of the valve body via a mouth 292 at the end of the body with the portholes. The mouth 292 includes gland packing 294 held in position by a stuffing box plate 296 to seal the valve body. The gland packing may comprise PTFE rope or other suitable material.

The blade 280 includes an aperture (not shown) which can be brought in to and out of alignment with the housing section apertures 274, 276 to allow material to flow through the valve or to shut the flow path.

In this embodiment the blade 280 is manually moveable and is provided with a handle 298. A label recess 299 is provided on the main body section 270.

Figure 22:
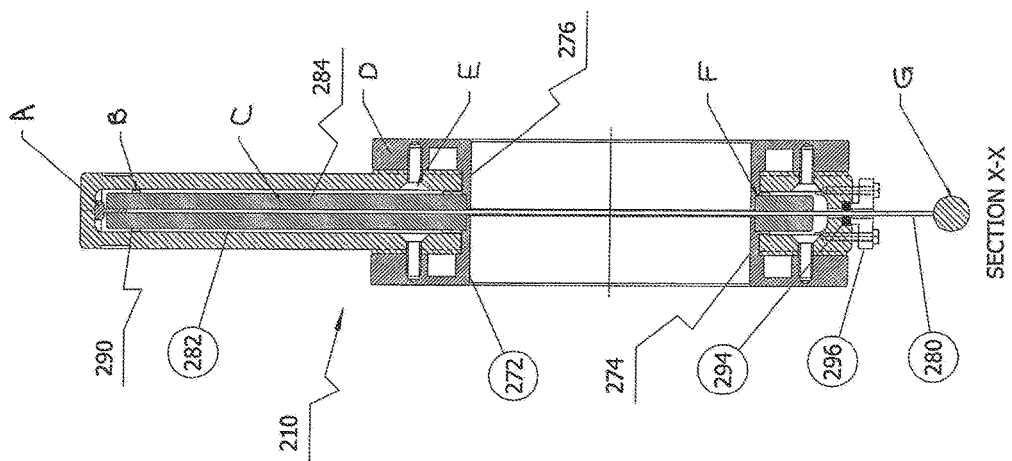
FIG. 22 is a section taken along line X-X of FIG. 20.
Figure 21:
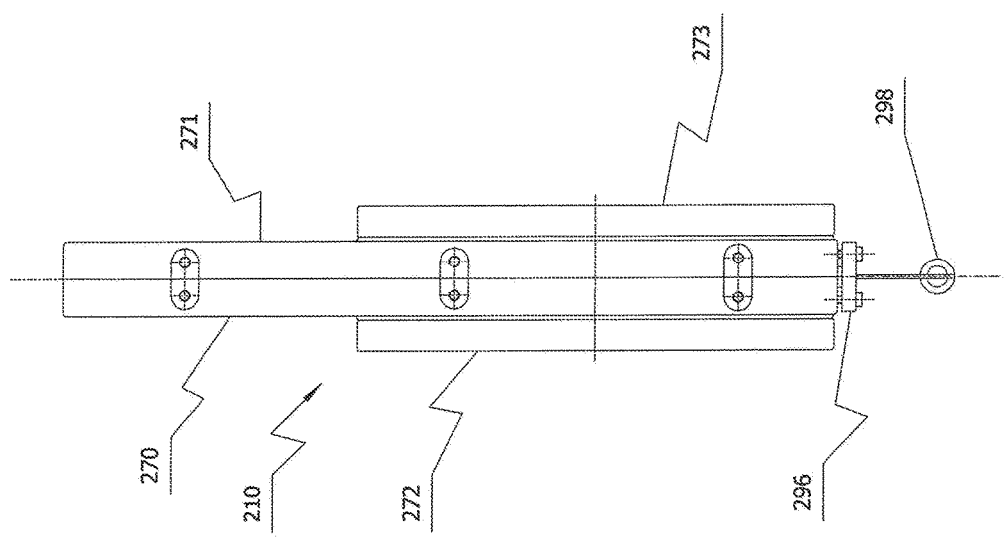
FIG. 21 is a side elevation of the valve of FIG. 20.
Figure 23:
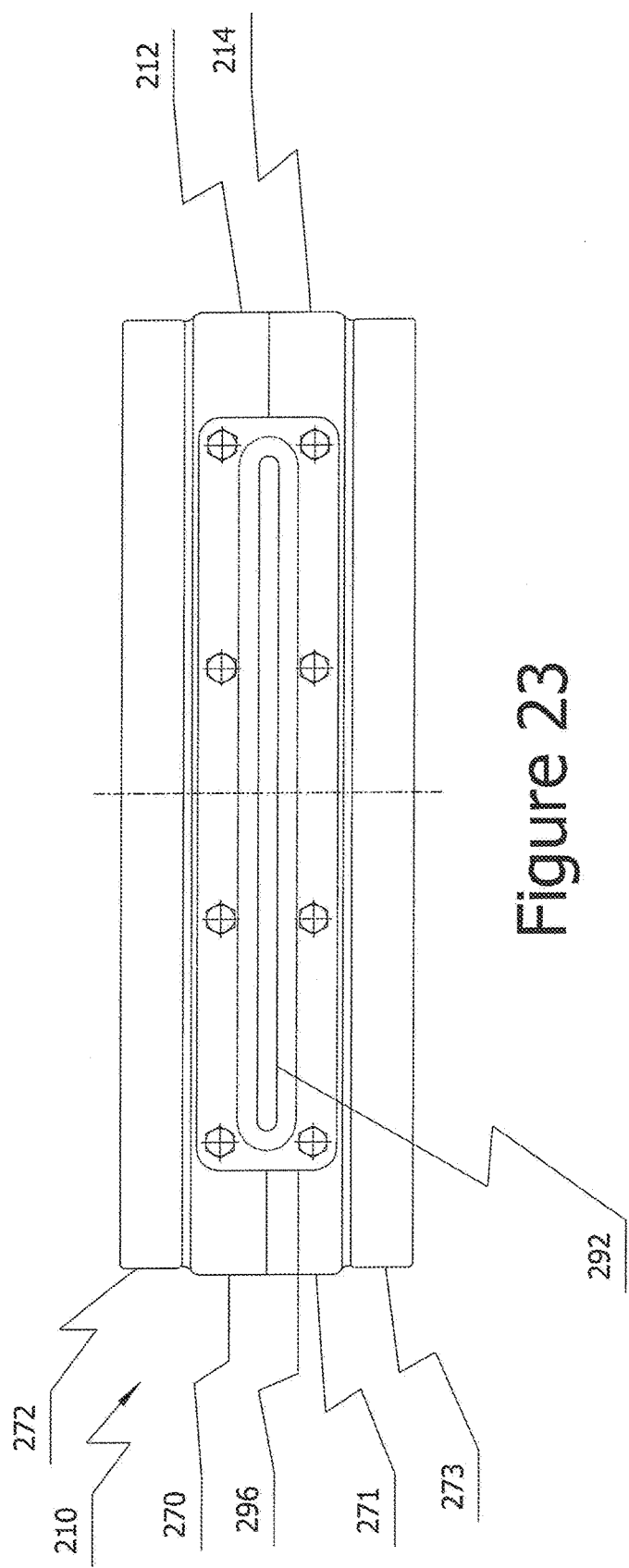
FIG. 23 is a front elevation of the valve of FIGS. 20 to 22.

Key for FIG. 22:

A Plastic spacer intended to float and maintain a gap between the seal plates when the blade is retracted (valve open) i.e. prevent excessive bowing of the plates. On a manual valves it also acts as a physical stop for the blade when it is fully inserted (valve closed).

B Wave springs are shown in these views. If used, then an additional spigot or protrusion of the casting will be required to locate this spring in position. If foam is used then the internal face of the casting can be machined flat (or left as a smooth cast surface) and the foam attached to the seal plate with adhesive.

C The seal plate thickness is intended to aid machining and maintain the flatness of the faces. Also to reduce distortion/deflection whilst the blade is retracted and the springing medium is still exerting its clamping force.

D Flange design as made from solid material. May be reconfigured for construction as a fabrication or from a casting. Materials—aluminium or stainless steel. Flange to be fitted to casting prior to valve assembly.

E Countersinking intended to leave screw head flush with surfaces below the seal plates and underflush the casting surface elsewhere.

F Annulus on flange used to limit the stroke of seal plate to prevent blade from contacting the flange nose in the event of blade deflection.

G A removable handle is required for the manual blade to allow fitting of the stuffing box plate. Tangs on the other end of the blade prevent plate assembly. The powered blade, without the tangs, may use a pressed/formed handle.

Figure 24:
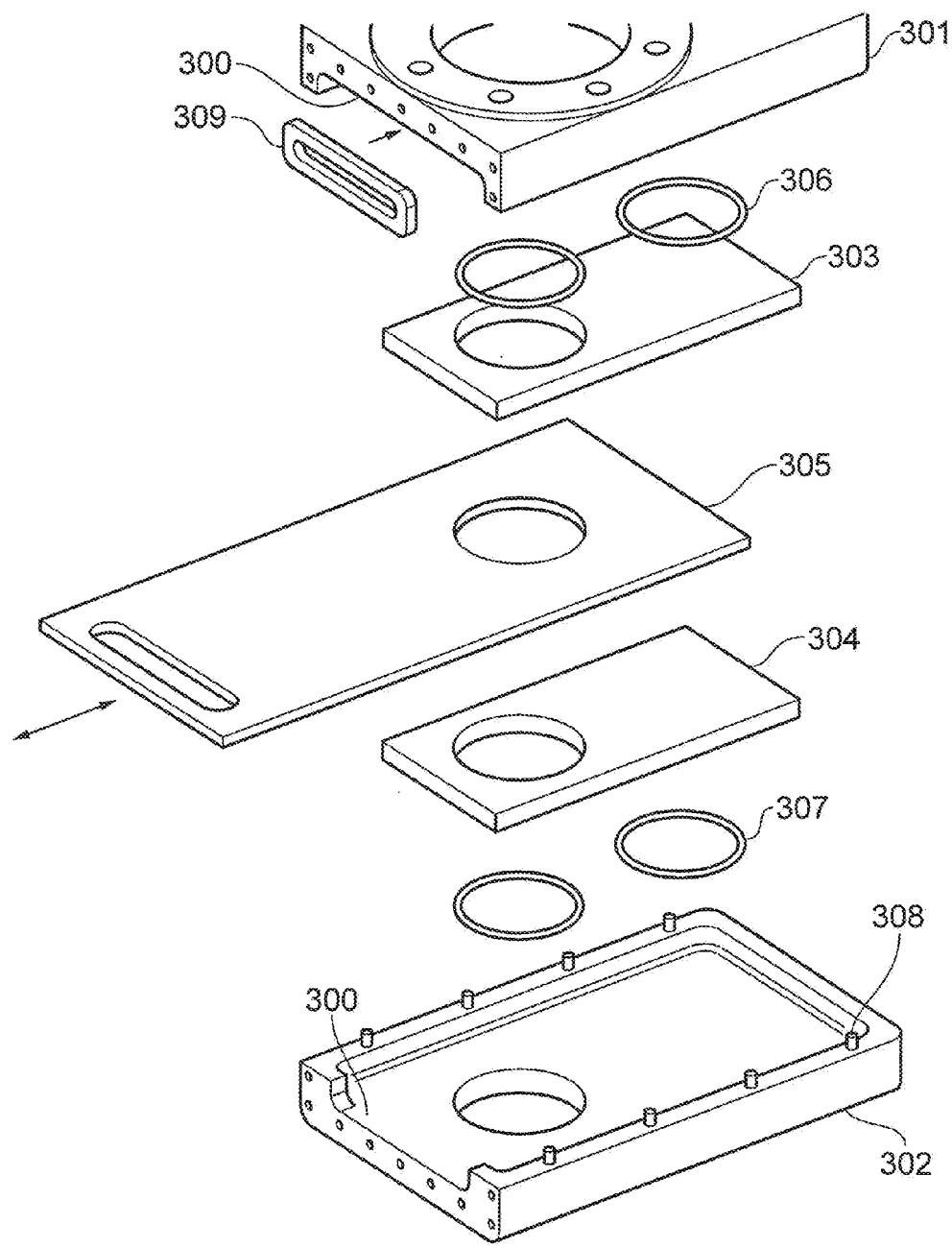
FIG. 24 is an exploded perspective view of a valve formed according to an alternative embodiment of the present invention.

Referring now to FIG. 24 there is shown a valve 310 formed according to an alternative aspect.

The components of the valve 310 are as follows: a body casting top half 301; a body casting bottom half 302; a top half sealing plate 303; a bottom half sealing plate 304; a central gate 305; loading devices in the form of springs 306, 307; nylon dowels 308; and an elastomeric seal 309.

The top and bottom castings 301, 302 are provided with respective sealing plates 303, 304 and springs 306, 307. The plates 303, 304 are provided on opposite sides of the gate 305 and are urged against it by the springs 306, 307. The nylon dowels 308 guide the gate 305 as it reciprocates in the valve housing.

Each casting 301, 302 half includes a front mouth cut-out 300 into which the generally rectangular seal 309 is fitted. The gate moves through the seal 309 as it reciprocates to block or unblock the valve.

Figure 25:
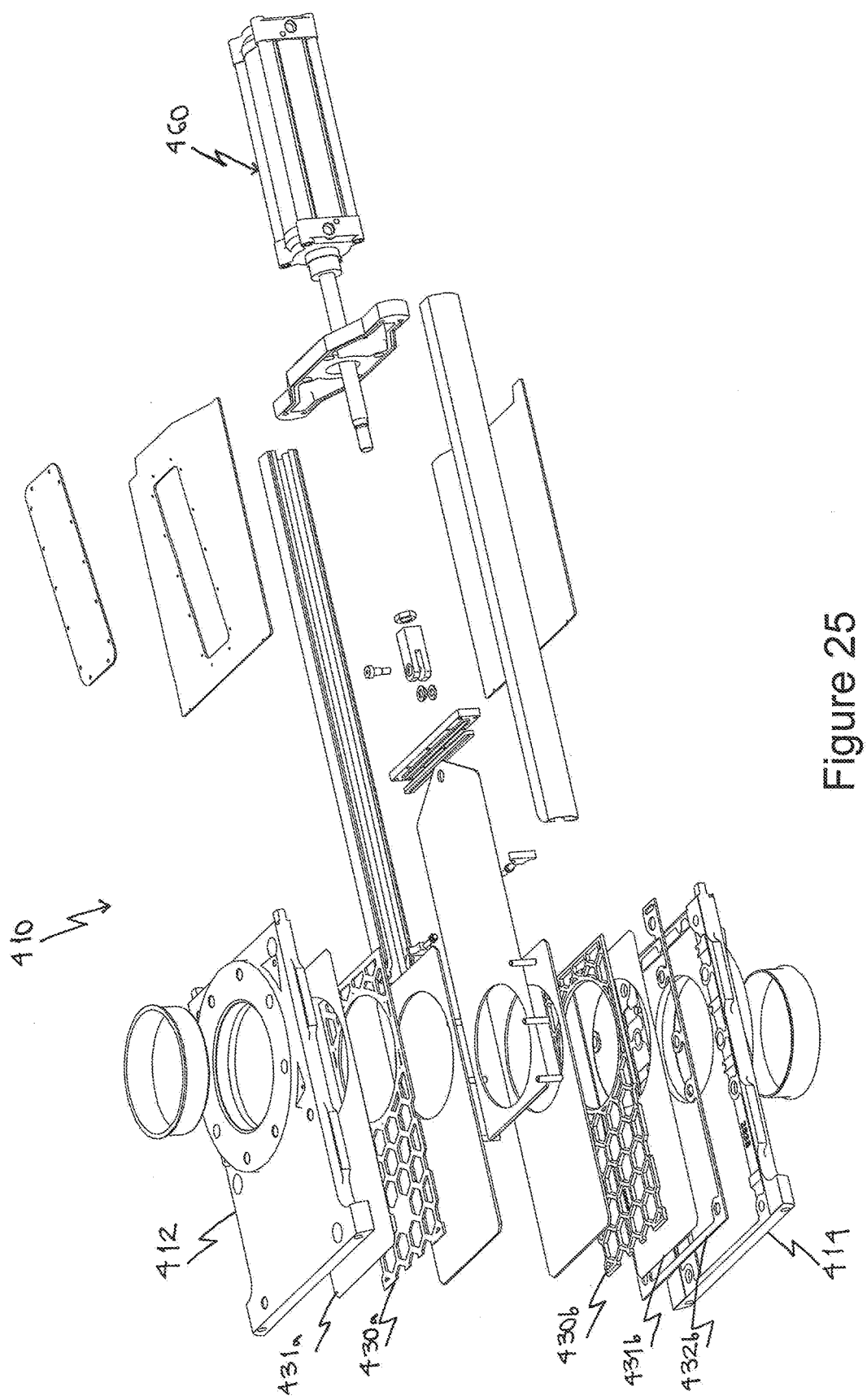
FIG. 25 is an exploded perspective view of a valve formed according to an alternative embodiment of the present invention.

In FIG. 25 there is shown a valve 410 formed according to an alternative embodiment of the present invention. The valve 410 is very similar to the valve 10 shown in FIG. 2, except there is additional sealing between each housing part 412, 414 and its respective mat 430a, 430b. The additional sealing is provided by a respective sealing sheet 431a, 431b and peripheral gasket 432b. In this embodiment the sealing plate is actuated by a pneumatic ram arrangement 460.

Figure 26:
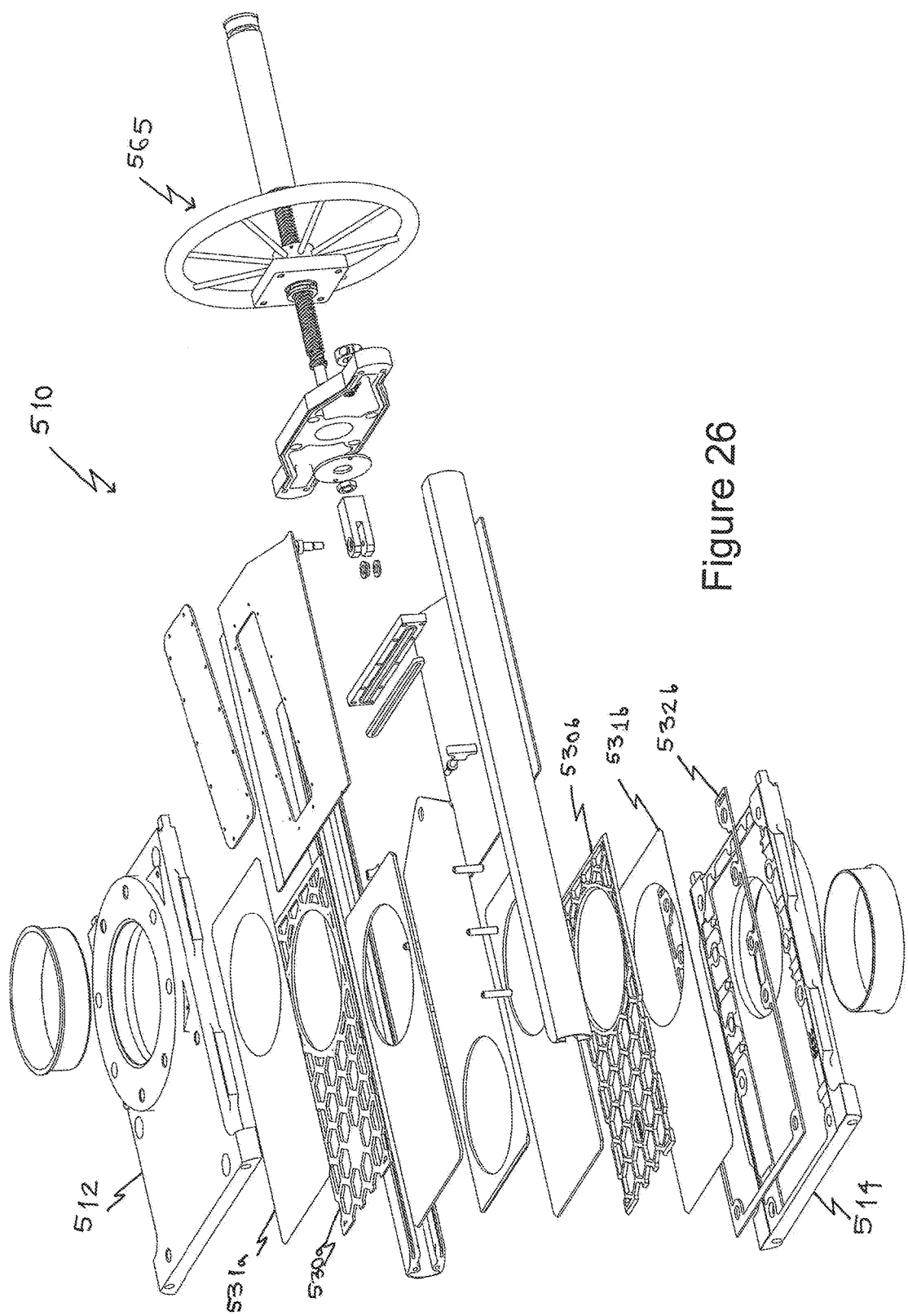
FIG. 26 is an exploded perspective view of a valve formed according to an alternative embodiment of the present invention.

In FIG. 26 there is shown a valve 510 formed according to an alternative embodiment. The valve is very similar to the valve 410 of FIG. 25 except that instead of a pneumatic actuator a handwheel arrangement 565 is provided. Similar to FIG. 25, there is additional sealing between each housing part 512, 514 and its respective mat 530a, 530b. The additional sealing is provided by a respective sealing sheet 531a, 531b and peripheral gasket 532b.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A gate valve comprising:
a valve body including an aperture,
a gate reciprocally movable within the body between a first position in which the aperture is occluded and a second position in which the aperture is open,
a bearing member in contact with a major surface of the gate and over which the gate moves in the body, and
a loading member arranged to urge the bearing member against the major surface of the gate, in which the loading member comprises a lattice-like elastomeric mat, the mat comprising a framework which defines a plurality of cut-outs, and the framework has a cross section with chamfered sides.

2. A gate valve as claimed in claim 1, in which the mat is configured to be separated from and to be placed against the bearing member.

3. A gate valve as claimed in claim 1, in which the mat has a generally honeycomb-like configuration.

4. A gate valve as claimed in claim 1, in which the mat is formed from a material having a Shore hardness in the range A5 to A25.

5. A gate valve as claimed in claim 1, in which the valve body comprises two complimentary housing sections, and in which each section comprises an aperture-defining part which is separate from and carried on or by a main body part.

6. A gate valve as claimed in claim 5, in which the aperture-defining part and the main body part are formed from the same material.

7. A gate valve as claimed in claim 5, in which the aperture-defining part and the main body part are formed from different materials.

8. A gate valve as claimed in claim 1, in which a respective bearing member is provided on each side of said gate, and a respective loading member is provided for each bearing member to urge them against the gate.

9. A gate valve according to claim 1, in which the bearing member comprises sealing plates.

10. A sealing plate according to claim 1, in which the aperture is generally circular.

11. A gate valve according to claim 1, in which the bearing member is formed from polyethylene terephthalate.

12. A gate valve according claim 1, in which the gate is moveable between the first and second positions by actuating means.

13. A gate valve according to claim 12, in which the actuating means comprise pneumatic means or a handwheel.

14. A gate valve according to claim 1, in which the body comprises side support rails for supporting an actuating means.

15. A gate valve as claimed in claim 14, in which the support rails comprise means for engaging a housing section and means for supporting the actuating means.

16. A gate valve as claimed in claim 1, in which the valve body comprises a mouth for receiving the gate and within which the gate slides, in which the mouth comprises a packing gland formed from an elastomeric material.

17. A gate valve as claimed in claim 1, in which the frame has a trapezoidal-like section.

18. A gate valve as claimed in claim 17, in which the trapezoidal-like section has parallel longer and shorter sides, and in which the mat can be orientated so that the shorter side is in contact with the bearing member.

19. A gate valve as claimed in claim 1, in which the framework defines hexagonal cut-outs.

20. A gate valve as claimed in claim 1, in which the mat is generally rectangular.

21. A gate valve as claimed in claim 20, in which the mat includes a circular aperture at one end thereof.

22. A gate valve comprising:
a valve body including an aperture,
a gate reciprocally movable within the body between a first position in which the aperture is occluded and a second position in which the aperture is open,
the valve body comprises two complimentary housing sections,
each housing section has a respective bearing member in contact with a major surface of the gate and over which the gate moves in the body, and
each housing section has a respective a loading member arranged to urge its respective bearing member against the major surface of the gate,
in which each loading member comprises a lattice-like elastomeric mat, the mat comprising a framework which defines a plurality of cut-outs and the framework has a cross section with chamfered sides.

* * * * *